(12) United States Patent
Wiik et al.

(10) Patent No.: US 8,613,466 B2
(45) Date of Patent: Dec. 24, 2013

(54) SIDE-IMPACT AIRBAG MODULE

(75) Inventors: Richard Andrew Wiik, Fort Gratiot, MI (US); Andrew Jack Pitonyak, Auburn Hills, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days.

(21) Appl. No.: 13/467,924

(22) Filed: May 9, 2012

(65) Prior Publication Data
US 2012/0286499 A1 Nov. 15, 2012

Related U.S. Application Data

(60) Provisional application No. 61/457,680, filed on May 10, 2011.

(51) Int. Cl.
*B60R 21/232* (2011.01)
*B60R 21/233* (2006.01)
*B60R 21/237* (2006.01)

(52) U.S. Cl.
USPC ............ 280/730.2; 280/729; 280/743.1

(58) Field of Classification Search
USPC .......... 280/730.2, 730.1, 729, 743.1, 728.1
See application file for complete search history.

(56) References Cited

U.S. PATENT DOCUMENTS

| | | | |
|---|---|---|---|
| 6,830,262 B2 | 12/2004 | Sonnenberg et al. | |
| 7,390,016 B2 * | 6/2008 | Noguchi et al. | 280/730.2 |
| 7,744,121 B2 * | 6/2010 | Ishikawa et al. | 280/730.2 |
| 7,775,553 B2 * | 8/2010 | Takemura et al. | 280/730.2 |
| 7,967,332 B2 * | 6/2011 | Karlsson | 280/730.2 |
| 7,967,334 B2 * | 6/2011 | Breuninger et al. | 280/743.1 |
| 8,157,290 B2 * | 4/2012 | Kjell et al. | 280/730.2 |
| 8,376,397 B2 * | 2/2013 | Yamamura et al. | 280/730.2 |
| 8,414,014 B2 * | 4/2013 | Nogami et al. | 280/728.2 |
| 2006/0157958 A1 | 7/2006 | Heudorfer et al. | |
| 2007/0296189 A1 | 12/2007 | Berntsson et al. | |

* cited by examiner

*Primary Examiner* — Paul Dickson
*Assistant Examiner* — Keith Frisby
(74) *Attorney, Agent, or Firm* — Foley & Lardner LLP (57) ABSTRACT

A side curtain air bag module includes an inflatable cushion and an inflator. The inflatable cushion includes a first panel coupled to a second panel. The inflator is configured to inflate the inflatable cushion. The first panel and the second panel are joined generally continuously at a peripheral edge to form a first inflatable chamber. The first panel and the second panel are joined at a central location to form a second inflatable chamber that is in fluidic communication with the first inflatable chamber. In a stored configuration, the first inflatable chamber is rolled in an outboard direction, and the second inflatable chamber is rolled in an inboard direction generally around the first inflatable chamber.

18 Claims, 8 Drawing Sheets

SIDE-IMPACT AIRBAG MODULE

CROSS-REFERENCE TO RELATED PATENT APPLICATIONS

This application claims the benefit and priority to U.S. Provisional Patent Application No. 61/457,680, filed May 10, 2011, which is incorporated by reference herein in its entirety.

BACKGROUND

The present disclosure relates generally to the field of airbag modules for use in vehicles, such as motor vehicles. More specifically, this disclosure relates to side-curtain airbag modules having a second deploying chamber configured to improve reliability of deployment to improve occupant restraint, while having a reduced cost.

SUMMARY

According to an exemplary embodiment, a side curtain air bag module includes an inflatable cushion and an inflator. The inflatable cushion includes a first panel coupled to a second panel. The inflator is configured to inflate the inflatable cushion. The first panel and the second panel are joined generally continuously at a peripheral edge to form a first inflatable chamber. The first panel and the second panel are joined at a central location to form a second inflatable chamber that is in fluidic communication with the first inflatable chamber. In a stored configuration, the first inflatable chamber is rolled in an outboard direction, and the second inflatable chamber is rolled in an inboard direction generally around the first inflatable chamber.

According to an exemplary embodiment, a side curtain airbag module for a motor vehicle includes a first inflatable chamber and a second inflatable chamber in fluidic communication with the first inflatable cushion. In a stored configuration, the first inflatable chamber is rolled in a first direction, and the second inflatable chamber is wrapped around the first inflatable chamber in an opposite direction to the first direction. During deployment, the second inflatable cushion is configured to be between the first inflatable cushion and a pillar structure of the motor vehicle. When fully deployed, the first inflatable cushion and the second inflatable cushion are each positioned adjacent the structure.

DETAILED DESCRIPTION

Side-curtain airbags (SCABs) are located in vehicles, such as motor vehicles, for restraining an occupant to avoid the occupant from directly impacting other vehicle components, such as a door assembly or a pillar assembly, and for reducing the impact forces on the occupant. SCABs are typically configured to provide restraint to outboard positioned vehicle occupants, such as those adjacent to door assemblies, however, SCABs may be used to provide restraint to any vehicle occupant located in any seating row (e.g., first, second, third) in the vehicle.

A SCAB module or system may include an airbag cushion having at least one inflatable chamber or portion, which deploys during a vehicle event triggering deployment of the SCAB, whereby inflation gas is rapidly pushed directly into the inflatable chamber of the airbag cushion by an inflator or other suitable device. The inflator may use a pyrotechnic device to generate inflation gas almost instantaneously and to push the inflation gas at a high volumetric flow rate into the inflatable chamber of the airbag cushion. A single side-curtain airbag may be configured to provide restraint to one or more than one vehicle occupant. For example, a SCAB module may include an airbag cushion configured with one inflatable chamber that provides restraint to more than one vehicle occupant, or may include an airbag cushion configured with more than one inflatable chamber, whereby different chambers may provide restraint to different vehicle occupants.

A SCAB module is generally stored within and deployed from the roof-rail (i.e., the portion of the vehicle provided between the top of the door frame and the roof member or assembly) of the vehicle. Side-curtain airbags are typically manipulated into a stored configuration through a process of folding, rolling, or a combination of rolling and folding to compact the airbag in order for the airbag to fit into the small volume (and small cross-section) of the vehicle roof rail and to aid vehicle installation of the airbag module. After vehicle installation, the airbag module may be covered, such as by a roof-liner or head-liner, to provide improved interior vehicle aesthetics.

Vehicles are configured with pillars that join the roof assembly to the vehicle, and typical vehicles (e.g., sedan) include three such pillars on each side of the vehicle, which are symmetrically configured about a fore-aft central axis through the vehicle from the three pillars on the opposite side of the vehicle. The first pillars (or A-pillars) are generally provided forward in the vehicle between the windshield and the front door assembly, whereby the A-pillar extends from a front panel (e.g., front-quarter panel) and/or hood to the roof assembly. The second pillars (or B-pillars) are generally provided centrally in the vehicle between the front and rear door assemblies, such as for a four-door sedan, whereby the B-pillar may extend from the floor assembly to the roof assembly. The third pillars (or C-pillars) are generally provided rearward in the vehicle between the rear window and the rear door assembly, whereby the C-pillar may extend from a rear panel (e.g., rear-quarter panel) and/or trunk to the roof assembly.

The pillars are typically configured to be high strength for safety of the occupants. The pillars are configured to be strong enough to resist buckling and/or bending, such as during a vehicle rollover event, and accordingly are typically made of steel or other high-strength materials with cross-sections, such as C-shaped cross-sections, having relative high moments of inertia that provide high bending and/or buckling resistance. The strength requirement of the pillar, especially the B-pillar, causes the pillar to often have a relatively large cross-section. The desire to keep exterior surfaces of the vehicle flush for aesthetic purposes, leads the design of the pillar to have the increased section protrude in the interior direction (i.e., toward the center of the vehicle). This protruding section induces the vehicle manufacturers to include trim and/or other members to cover the pillar on the interior side of the vehicle to improve the interior vehicle aesthetics.

Figure 7A:
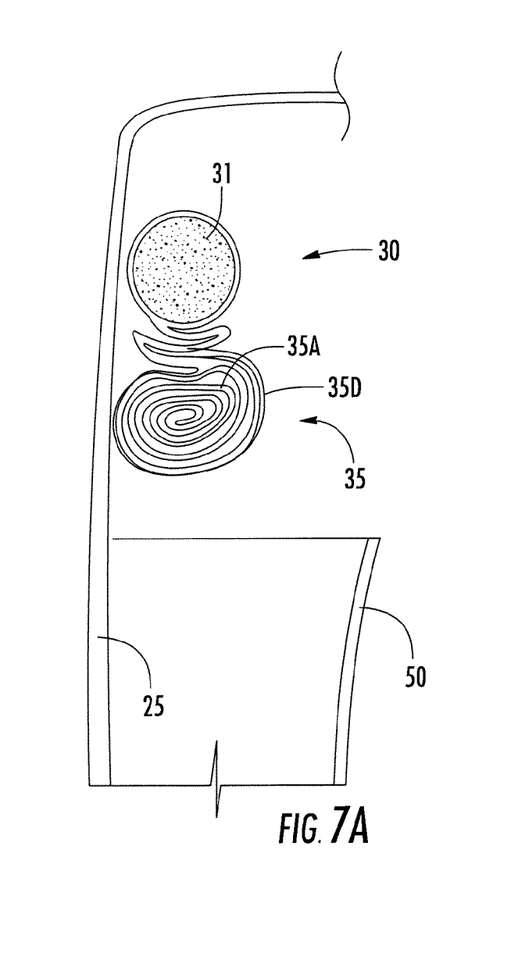
FIGS. 7A and 7B are sequential cross-sectional views of an airbag module according to an exemplary embodiment being deployed from a stored position.
Figure 7B:
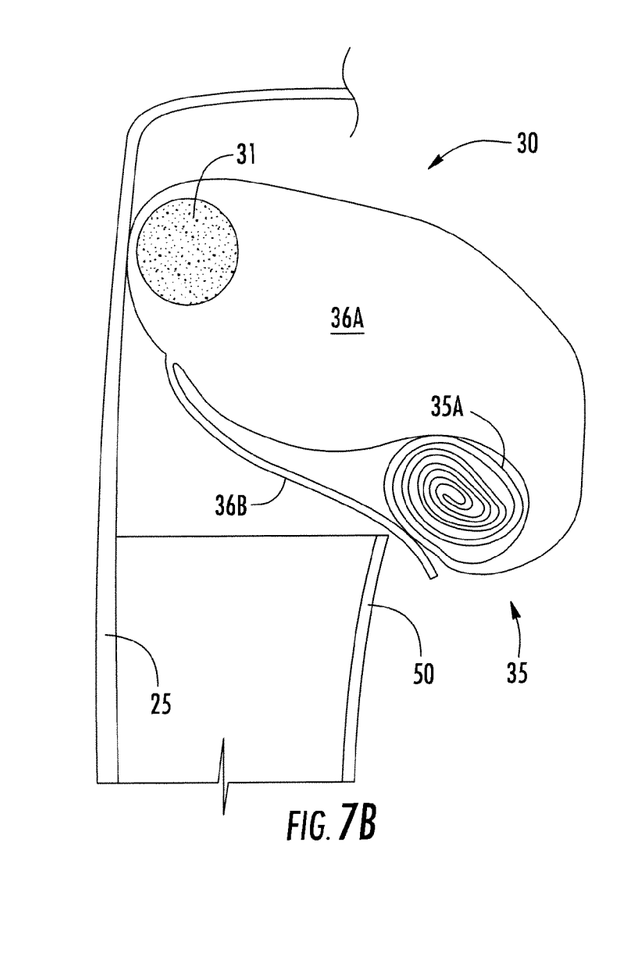

The trim or other members used to cover the pillar (e.g., B-pillar) to improve aesthetics generally are made of a polymer or other similar material, and will be configured to include a C-shaped (or other suitable) cross-section that forms an inner channel that the pillar occupies after installation of the trim cover. FIG. 7A illustrates an exemplary embodiment of a trim cover 50 surrounding the steel B-pillar 25. The shape of the trim cover coupled with the shape of the B-pillar form a lip that protrudes inwardly toward the interior of the vehicle from just below the roof-rail, which is configured to house or store the SCAB module. This inwardly protruding lip can be problematic. For example, this lip may serve as a catch to a SCAB deploying from the roof-rail, causing the cushion deployment to be delayed or the deployment trajectory of the cushion to be influenced, which has the potential to reduce the effectiveness of occupant restraint.

A SCAB is often rolled (for storage) in an outboard direction to have a substantially downward deployment trajectory that substantially follows the contour of the door and window assembly as the cushion extends and unfolds downwardly. This configuration avoids having the cushion deploy in a lateral or quasi-lateral direction, such as in an oblique direction, substantially toward the occupant inducing relative higher impact (or "punch") forces upon contact with the occupant due to higher lateral forces from the lateral acceleration of the deploying airbag cushion induced by higher internal airbag pressure caused by inflation gas. However, the lip formed by the trim cover and B-pillar may delay and/or influence the deployment trajectory of the airbag cushion by acting as a catch.

The airbag modules described herein are configured to include a second inflatable chamber to provide a method for avoidance of the inflating cushion from catching on the lip formed by the pillar (e.g., B-pillar), the trim cover, or other structure of the vehicle, such that side-impact airbag cushion deploys in an undelayed and unimpeded manner, as well as deploying without influence to trajectory from the lip in order to deploy to a final position that optimizes occupant restraint. The airbag modules described herein may be configured to continue deploying (once beyond the lip) in an approximately downward direction along the interior of the vehicle in order to reduce the lateral and quasi-lateral forces to reduce the impact forces on the restrained occupant. The second inflatable chamber of the airbag modules described herein may be further configured to provide restraint and/or protection to the occupant in the region adjacent to the pillar of the vehicle, such as the B-pillar, so that occupant would not directly impact the pillar or trim cover covering the pillar, and would instead be restrained by the deployed second inflatable chamber provided between the pillar and the occupant.

Figure 1:
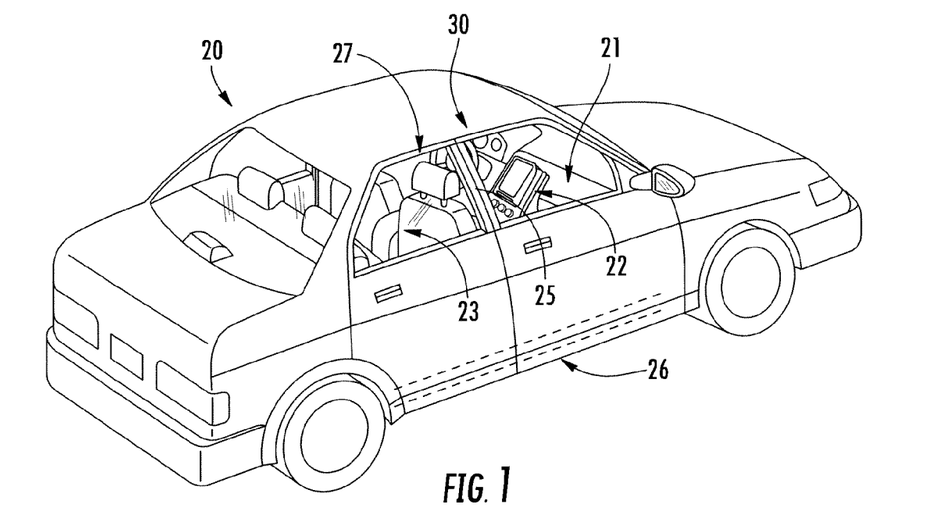
FIG. 1 is a perspective view of a motor vehicle with an exemplary embodiment of a side-curtain airbag module shown stored in the roof-rail of the vehicle.

With reference to FIG. 1, an exemplary embodiment of a motor vehicle 20 is illustrated and includes an interior compartment 21 configured to include one or more occupants (not shown). According to an exemplary embodiment, the interior compartment 21 includes a forward seating position 22 to provide seating to a forward occupant (not shown) and a rearward seating position 23 to provide seating to a rearward occupant (not shown). The vehicle 20 further includes a roof-rail 27 provided between the roof and the door assemblies (e.g., the front and rear passenger doors), a structural (or frame) member 26, and a pillar (e.g., B-pillar) 25 provided between the front and rear door assemblies extending a length that is between the roof-rail 27 and the structural member 26.

According to an exemplary embodiment, the vehicle 20 includes a side-curtain airbag module 30 stored within and configured to deploy from the roof-rail 27 of vehicle 20. The SCAB module 30 may provide occupant restraint to at least one passenger or occupant during airbag deployment. According to an exemplary embodiment, the SCAB module 30 is configured to provide restraint to at least one occupant located on the passenger-side of the vehicle 20, during an airbag deploying event. According to another exemplary embodiment, the SCAB module is configured to provide restraint to at least one occupant located on the driver-side of the vehicle 20, during an airbag deploying event. Those skilled in the art will recognize that the airbag modules disclosed herein can be included within any vehicle configured to include an occupant and may be used to restrain and/or otherwise cushion any occupant (e.g., driver, front passenger, rear passenger). It should be noted that the airbag modules disclosed and illustrated herein are not meant as limitations.

Figure 2:
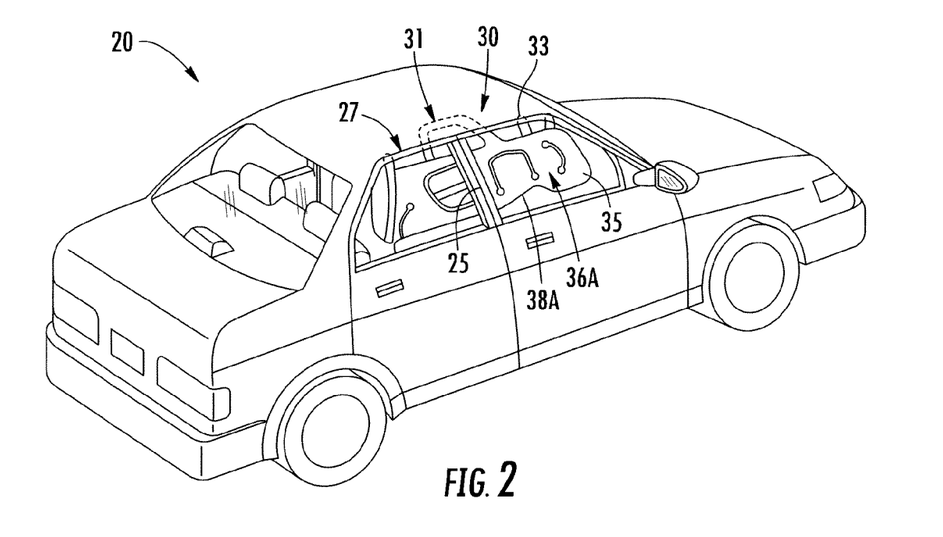
FIG. 2 is a perspective view of a motor vehicle with an exemplary embodiment of a side-curtain airbag module shown deployed from the roof-rail of the vehicle.

With reference to FIG. 2, the motor vehicle 20 is illustrated with the SCAB module 30 deployed (or inflated) from the roof-rail 27 to a position provided between the occupants (not shown) and the interior surfaces of the door assemblies. The SCAB module 30 is triggered by a dynamic vehicle event, such as a rollover or side impact, whereby vehicle sensors recognize the vehicle event and communicate to a control device or module, which in turn initiates deployment of the airbag. According to an exemplary embodiment, the deployed SCAB module 30 provides restraint and/or cushioning to the front and rear occupants located on the passenger-side of vehicle 20. The SCAB module 30, for example, restrains or cushions the occupants to prevent contact with the interior of the door assemblies located on the passenger-side of the vehicle 20, with the B-pillar 25 provided between the front and rear door assemblies, and/or with other vehicle 20 components with a relative high force created by a relative high acceleration of the occupants induced by the sudden deceleration of the vehicle 20.

According to an exemplary embodiment, SCAB module 30 includes a plurality of mounting members 33 to couple the module to the roof-rail 27 of the vehicle 20, an inflatable airbag cushion 35 having a first inflatable chamber 36A configured to provide cushioned restraint to an occupant when inflated during deployment, and an inflator 31 to provide inflation gas to the inflatable chamber 36A. The inflator 31 may be configured using any known or future developed methods, and may include any device, such as a pyrotechnic device, for producing inflation gas to inflate the airbag cushion 35. According to an exemplary embodiment, the mounting members 33 are tabs integrally formed with the airbag cushion 35 that couple the SCAB module 30 to the vehicle 20. According to other exemplary embodiments, the mounting members 33 are separately formed members (e.g., fabric straps, steel or composite brackets, etc.) that couple to the airbag cushion 35 and to the vehicle 20, such as the roof-rail 27, through any suitable method. The mounting members 33 may be configured using any suitably known or future developed methods.

Upon being triggered to deploy, the inflator 31 inflates the airbag cushion 35, which breaches the roof-rail 27 (in which it is stored in) due to the increasing high internal pressure caused by the generated inflation gas. The airbag cushion 35 unfolds with the leading edge of the deployment 38A of the airbag cushion moving away from the roof-rail 27, the inflator 31, and the trailing edge of deployment of the cushion (e.g., mounting members 33) in a direction substantially downward and along the interior surface of the door assemblies. According to an exemplary embodiment, the final deployed location of the airbag cushion 35 is positioned between the door assemblies and the occupants (see, e.g., FIG. 2).

According to another exemplary embodiment, the vehicle 20 includes two SCAB modules stored within the passenger-side roof-rail 27. The first SCAB module is configured to deploy to restrain the front occupant located on the passenger-side of the vehicle 20 to prohibit the occupant from directly impacting the interior of the front door assembly as well as the B-pillar 25. The second SCAB module is configured to deploy to restrain the rear occupant located on the passenger-side of the vehicle 20 to prohibit the occupant from directly impacting the interior or the rear door assembly as well as the B-pillar 25.

Figure 3:
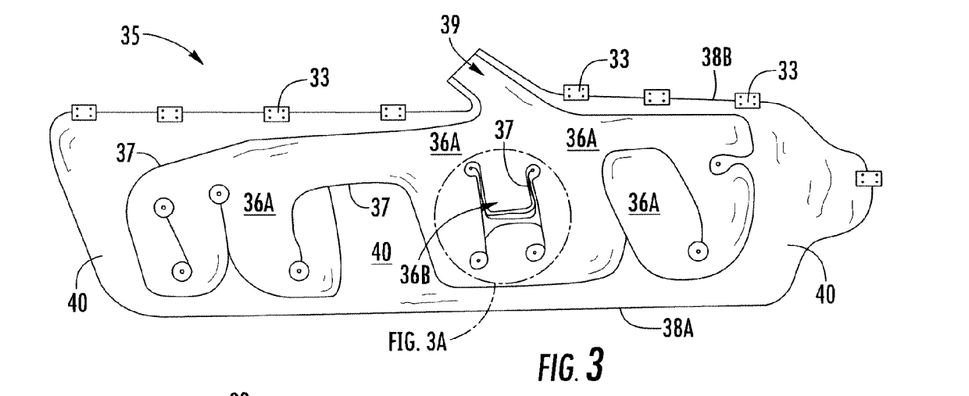
FIG. 3 is a side-view of an exemplary embodiment of an airbag cushion for use in an airbag module shown unfolded with the cushion having a second inflatable chamber.

With reference to FIG. 3, an exemplary embodiment of an airbag cushion 35 for use in a SCAB module 30 is illustrated in the flat, prior to folding and/or rolling into the stored configuration. The airbag cushion 35 may be formed from one or more airbag panels coupled through conventional methods (e.g., stitching, adhesive) at seams 37 to form at least one inflatable chamber 36A configured to receive inflation gas from the inflator during deployment. The seams 37 may form one or more non-inflatable portions 40 on the airbag cushion 35, whereby the non-inflatable portions 40 are configured not to receive inflation gas during airbag deployment.

According to an exemplary embodiment, the airbag panels forming the airbag cushion 35 are made from conventional high strength material (e.g., woven nylon fabric) and form a substantially rectangular shape. According to other embodiments, the panels may be made from any suitable material and may form any suitable shape, which may vary to accommodate different vehicle configurations. The airbag panels forming the airbag cushion 35 may be coated with a coating (e.g., silicone) to prohibit the escape of inflation gas, during deployment, through the porosity of the airbag panels. The seams 37 may be sealed with a sealant to prohibit the escape of inflation gas due to separation of the seam caused by separation forces from the high internal pressure in the cushion during deployment. According to an exemplary embodiment, the cushion 35 includes an inflator connection (or inlet) 39, which allows the inflator 31 to couple to the cushion 35 so that upon deployment, inflation gas is pushed directly into the first inflatable chamber 36A from the inflator 31.

The first inflatable chamber 36A may include pockets or sub-chambers that are formed by seams 37 (or stitches), whereby the pockets may be fluidly connected so that inflation gas from the inflator 31 may pass through a portion of the first inflatable chamber 36A into the various pockets of the first inflatable chamber 36A. The pockets of the inflatable chamber 36A may be located on the cushion 35 in a configuration to provide optimal restraint to one or more occupants, and the location of the pockets may be varied to accommodate different vehicle requirements or configurations. Further, the seams 37 may divide the pockets into multiple pockets, which may be to influence the deployment sequence of the cushion.

According to an exemplary embodiment, the airbag cushion 35 includes a second inflatable chamber 36B that is integrally formed with the airbag cushion 35. The second inflatable chamber 36B is formed from the existing fabric of the panels forming the airbag cushion 35 and is formed by a seam 37, which separates the second inflatable chamber 36B from the adjacent first inflatable chamber 36A. The second inflatable chamber 36B may be fluidly connected to the first inflatable chamber 36A to receive inflation gas from the inflator 31 after passing through the first inflatable chamber 36A.

Figure 3A:
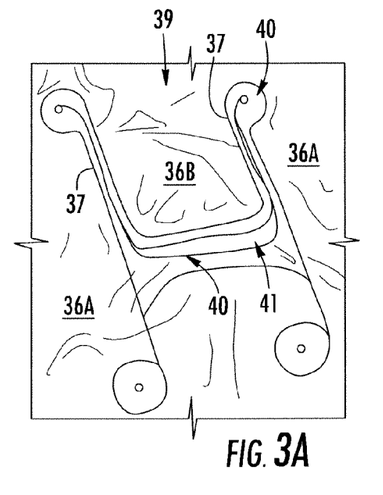
FIG. 3A is a detail view of the second inflatable chamber of the airbag cushion of FIG. 3.

According to the exemplary embodiment shown in FIG. 3A, the seam 37 that forms the second inflatable chamber 36B is substantially H-shaped having circular shaped ends on each leg of the "H" forming a non-inflatable portion 40 within the enclosed profile of the seam 37. The top of the H-shaped seam forms the opening 39 where inflation gas may pass from the first inflatable chamber 36A into the second inflatable chamber 36B. Within the enclosed profile formed by seam 37, the airbag cushion 35 includes a slit or cut 41 to separate the second inflatable chamber 36B from the adjacent portion of the airbag cushion 35. According to the exemplary embodiment shown, the cut 41 is U-shaped and provided on the top portion of the H-shaped seam 37, thereby forming a downward facing substantially rectangular shaped second inflatable chamber 36B (e.g., such that the second inflatable chamber 36B is detached from the first inflatable chamber 36A at its sides and a bottom edge). The downward facing second inflatable chamber 36B being separated from the remaining portion of the airbag cushion 35 allows for the second inflatable chamber 36B to be configured differently than the remaining portion, such as for example, during the process of rolling and folding the cushion into the stored configuration. According to an exemplary embodiment, the second inflatable chamber 36B is provided on the portion of the cushion that deploys adjacent to a pillar, such as the B-pillar, of the vehicle. The second inflatable chamber 36B may be configured essentially as an inflatable flap.

The airbag cushion 35 is configured for storage and installation into a vehicle through a process of folding and rolling (as shown, for example, in FIGS. 4A-4B and 5A-5C). According to an exemplary embodiment, the airbag cushion 35 is first rolled from the leading edge of deployment 38A toward the outboard direction to form the OB roll 35A. When the OB roll 35A of the cushion reaches the second inflatable chamber 36B, the airbag cushion 35 including the first inflatable chamber 36A is rolled in the outboard direction forming a larger OB roll 35A, while the second inflatable chamber 36B is located outside of the OB roll 35A, such that the second inflatable chamber 36B extends away from the top of the cushion in an outboard and downward direction. The amount of the height of the cushion 35 (i.e., the length of the cushion 35 from the leading edge of deployment 38A to the trailing edge of deployment 38B) that is rolled forming the OB roll 35A may vary. As examples, eighty percent (80%) or sixty percent (60%) of the height of the cushion 35 may form the OB roll 35A. The amount of cushion used to form the OB roll 35A can be any amount, and the examples disclosed herein are not meant as limitations.

After forming the OB roll 35A, the remaining height of the cushion 35 (including the inlet 39) may be folded using one or more than one fold. According to an exemplary embodiment, the portion of the cushion adjacent and above the OB roll may be folded into a first Z-shaped fold 35B with the lower leg of the Z-fold 35B extending into the OB roll 35A and the upper leg of the Z-shaped fold extending into a second V-shaped fold 35C. The V-shaped fold 35C may be provided adjacent to the OB roll 35A and the Z-shaped fold 35B toward the outboard side of the airbag cushion (labeled as OB in FIGS. 5A and 5B). A portion of the second inflatable chamber 36B between the end that abuts the first inflatable chamber 36A and the separated end may be provided between the OB roll 35A and the V-fold 35C of the cushion 35.

Following the formation of the V-shaped fold 35C, the separated end of the second inflatable chamber 36B that extends away from the portion provided between the OB roll 35A and the V-fold 35C of the cushion 35 may be rolled or wrapped around the OB roll 35A to form a second roll. According to an exemplary embodiment, the second inflatable chamber 36B is rolled in the inboard direction (labeled "IB" in FIGS. 5A-5C) to form the IB roll 35D. The IB roll 35D formed by the second inflatable chamber 36B may wrap around the outer profile formed by the exterior of the OB roll 35A. According to an exemplary embodiment, the separated end of the second inflatable chamber 36B (i.e., forming the IB roll 35D) is placed loosely into the Z-fold 35B (i.e., the separated end and remains uncoupled) (see e.g., FIGS. 4B and 5B). According to another exemplary embodiment, the separated end of the second inflatable chamber 36B is coupled to the cushion, such as the Z-fold 35C, using a release mechanism, such as a tear stitch, that is configured to release at a predetermined tension. The release mechanism may be configured to release at a very low tension, which retains the stored configuration of the cushion, such as during shipment and installation, yet enables the airbag cushion to deploy without impediment or delay by releasing the couple between the second inflatable chamber 36B and the cushion 35.

Figure 5A:
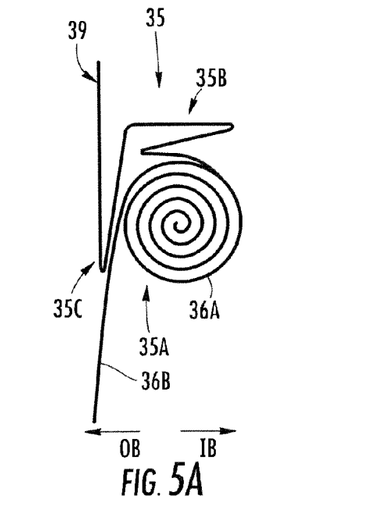
FIG. 5A is a cross-sectional view of the airbag module of FIG. 4A.
Figure 5B:
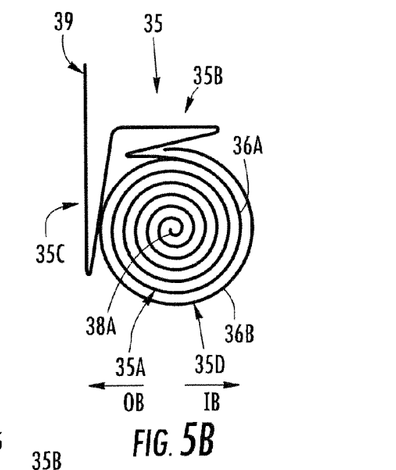
FIG. 5B is a cross-sectional view of the airbag module of FIG. 4B.
Figure 5C:
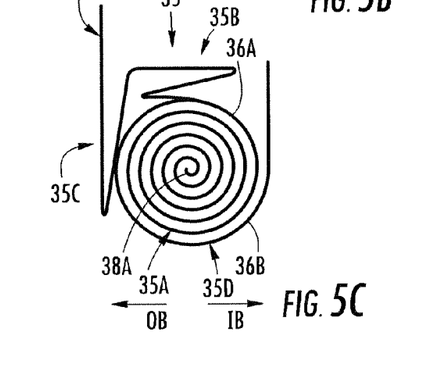
FIG. 5C is a cross-sectional view of an airbag module according to another exemplary embodiment.

According to another exemplary embodiment, the separated end of the second inflatable chamber 36B forms an IB roll 35D, wrapping around the OB roll 35A in the inboard direction, whereby the separated end is then provided above the Z-fold 35A (see FIG. 5C). The separated end may couple to the adjacent portion of the cushion, such as by using a release mechanism, or may remain uncoupled to the adjacent portion of the cushion. According to other embodiments, the cushion may be configured differently than those disclosed using any process involving folding, rolling, or a combination of folding and rolling. It should be noted that the stored configurations for the airbag cushion disclosed herein are not meant as limitations.

Figure 3B:
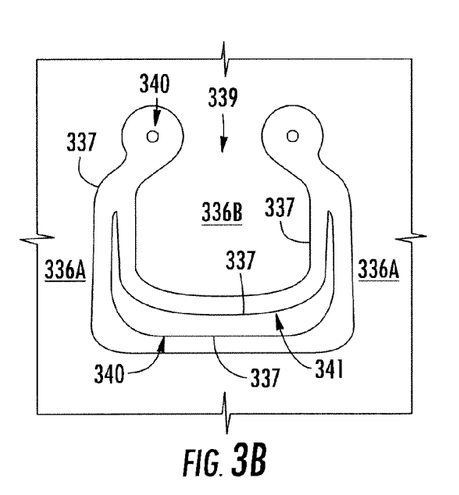
FIG. 3B is a detail view of a second inflatable chamber of the airbag cushion according to another exemplary embodiment.
Figure 4A:
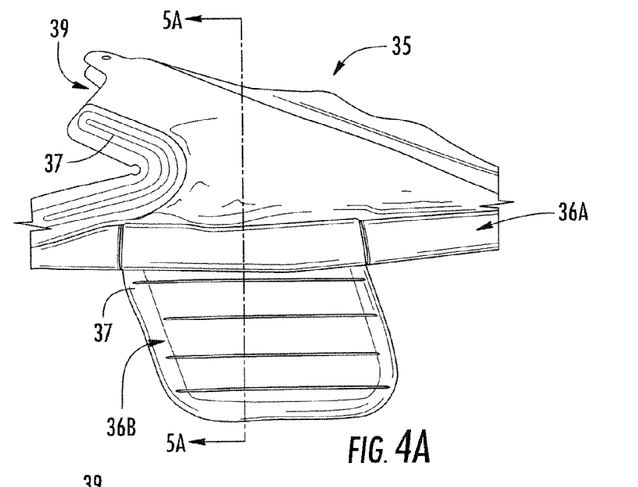
FIG. 4A is a perspective view of an exemplary embodiment of an airbag module having a first inflatable chamber rolled and the second inflatable chamber unrolled.
Figure 4B:
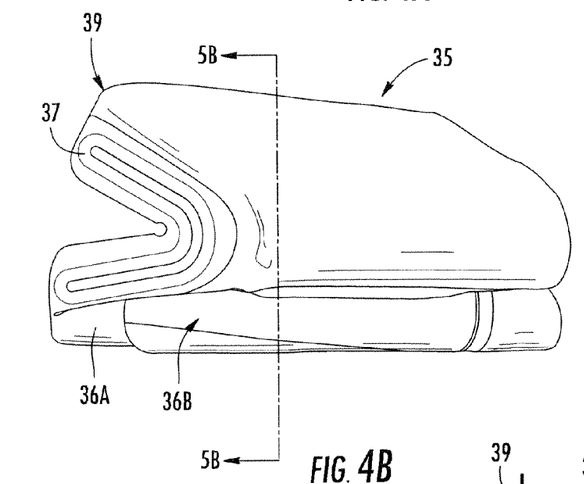
FIG. 4B is a perspective view of an exemplary embodiment of an airbag module having a first inflatable chamber rolled and the second inflatable chamber rolled.

With reference to the partial view shown in FIG. 3B, another exemplary embodiment of a second inflatable chamber for an airbag cushion for use in an airbag module is shown in the flat and prior to rolling and/or folding into the stored configuration. The airbag cushion includes a plurality of seams 337 dividing the cushion into a first inflatable chamber 336A and a non-inflatable portion 340, and a plurality of mounting tabs 33 to couple the cushion to the vehicle. The airbag cushion 35 includes an inlet 39 configured to couple to an inflator (not shown), whereby when triggered, inflation gas from the inflator is configured to fill and expand the first inflatable chamber 336A to provide occupant restraint. According to an exemplary embodiment, a seam 337 also forms a second inflatable chamber 336B provided in the first inflatable chamber 336A and located to be adjacent to a pillar of the vehicle upon deployment.

According to the exemplary embodiment shown in FIG. 3B, the seam 337 that forms the second inflatable chamber 336B is shaped substantially as a U, whereby the ends of each leg of the U extend toward the other end. The seam 337 is a continuous profile and forms an enclosed area, whereby a non-inflatable portion 340 is enclosed within the profile of the seam 337. The top of the ends of the U-shaped seam 337 forms an opening 339 where inflation gas may pass from the first inflatable chamber 336A into the second inflatable chamber 336B. Within the enclosed area formed by the profile of the seam 337, the airbag cushion 35 includes a slit or cut 341 to separate the second inflatable chamber 336B from the adjacent airbag cushion 35. According to the exemplary embodiment shown, the cut 341 is substantially U-shaped, thereby forming a downward facing substantially rectangular shaped second inflatable chamber 336B that is separated from the remaining portion of the airbag cushion 35. This allows the second inflatable chamber 336B to be configured differently than the remaining portion of the cushion 35. For example, the second inflatable chamber 336B may be rolled in a direction opposing the roll direction of the remaining portion of the cushion, such as the first inflatable chamber 336A.

The airbag cushion 35 may be configured for storage and installation into a vehicle using the methods described herein for other exemplary embodiments, or may be configured for storage using a different process of folding, rolling, or a combination of folding and rolling.

The airbag cushions having second inflatable chambers formed within the first inflatable chamber are configured to aid the first inflatable chamber from catching, during deployment of the cushion, on the lip formed by the pillar and/or trim cover of the pillar to allow the cushion to deploy in an unimpeded and undelayed manner to a final position to restrain the occupant. The second inflatable chamber also provides occupant protection by preventing the occupant from direct contact with the pillar and/or trim cover by deploying to a position between the occupant and the pillar then inflating from inflation gas received through the first inflatable chamber. The second inflatable chamber formed within the first inflatable chamber provides these advantages in a low cost manner by utilizing existing material and not requiring extra material to form the second inflatable chamber.

Figure 6A:
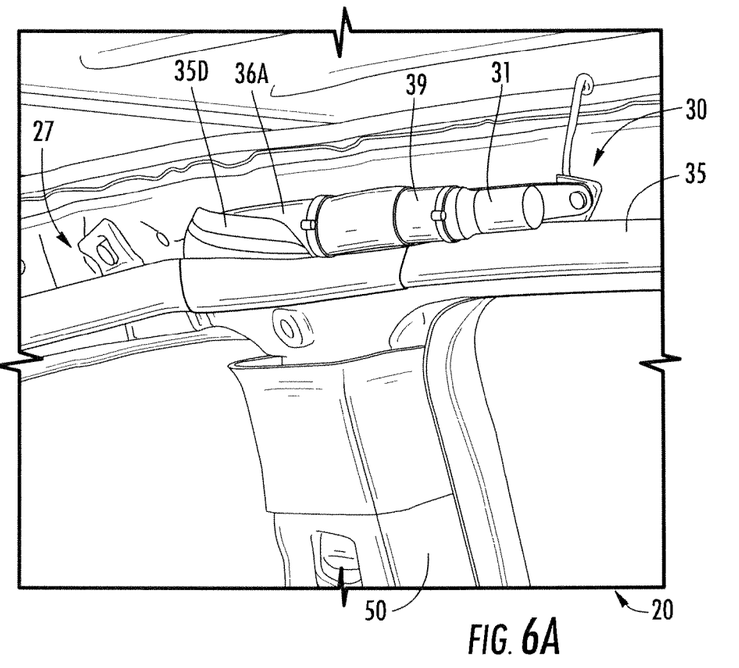
FIGS. 6A to 6G are sequential side perspective views of an air bag module according to an exemplary embodiment being deployed from a stored position to a fully deployed position.

With reference to FIGS. 6A-6G, the airbag module 30 having an airbag cushion 35 with a first inflatable chamber 36A and a second inflatable chamber 36B is shown deployed from the roof-rail 27 of the vehicle 20 at varying stages of deployment from the initiation of deployment of the airbag cushion 35. In FIGS. 6A-6G, it should be noted that 36A generally indicates portions of the first chamber that are in unrolled and/or inflated states, while 35A generally indicates portions of the first chamber in a rolled state. Similarly, 36B generally indicates the second chamber in unrolled and/or inflated states, while 35D generally indicates the second chamber in a rolled state. FIG. 6A is a view from inside the vehicle 20 of the airbag cushion 35 at a time increment just after initiation of deployment of the airbag cushion (e.g., approximately 0.064 ms from initiation of deployment). Inflation gas created by the inflator 31 expands the airbag cushion 35 beginning with the first chamber 36A. The stored module 30 is located in the roof-rail 27 and provided above the trim cover, which protrudes inwardly forming the lip that the deploying airbag cushion avoids catching on.

Figure 6B:
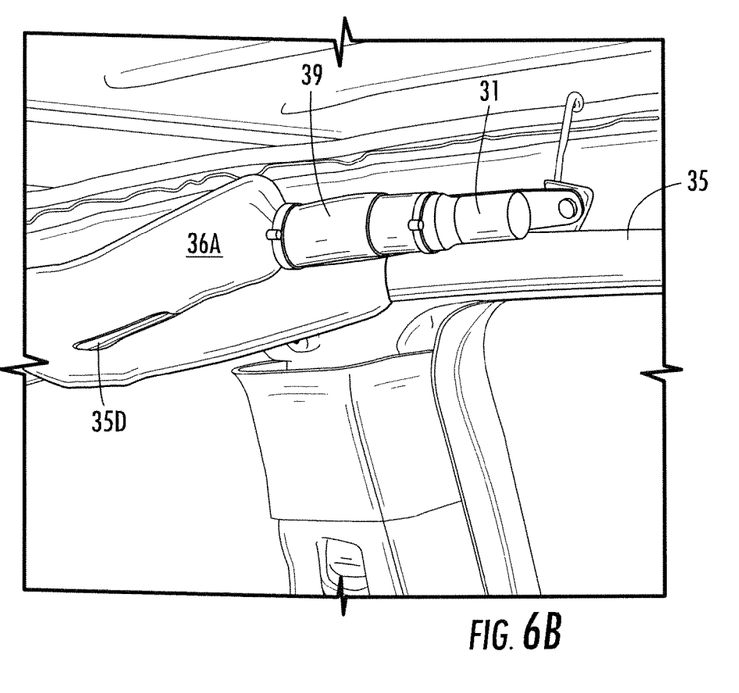
Figure 6C:
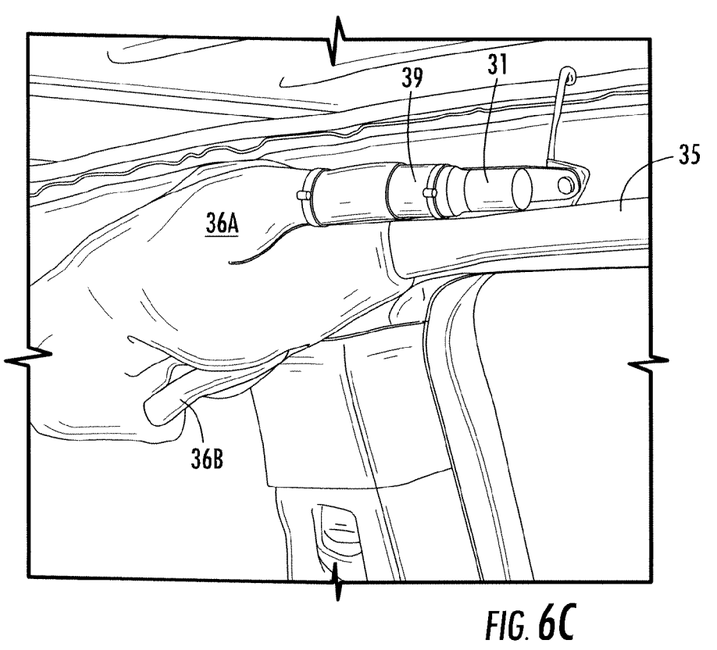

FIG. 6B is a view from inside the vehicle 20 of the airbag cushion 35 later during deployment (e.g., approximately 2.914 ms from the initiation of deployment of the airbag cushion), whereby the airbag cushion 35 continues inflating the first chamber 36A from the stored configuration. During inflation and deployment of the airbag cushion 35, such as shown the remaining sequential figures, the uninflated second deploying chamber 36B (i.e., in the form of the IB roll 35D)

begins to unfold or unwrap from around the rolled first inflatable chamber 36A (which is in the form of the OB roll 35A) due to the expanding or inflating first inflatable chamber 36A to a location between the first inflatable chamber 36A and the lip of the trim cover 50, whereby the uninflated second deploying chamber 36B extends beyond the lip of the trim cover 50 allowing the inflating first deploying chamber 36A to deploy unimpeded and undelayed beyond the lip of the trim cover 50. FIG. 6C is a view from inside the vehicle 20 of the airbag cushion 35 later during deployment (e.g., at a time increment of approximately 4.314 ms from the initiation of deployment of the airbag cushion), whereby the airbag cushion is deployed over the trim cover of the pillar assembly 50 with the non-inflated second deploying chamber 36B (or IB roll 35D unrolled) provided between the outboard roll 35A of the first inflatable chamber 36A and the trim cover (and pillar), allowing the outboard roll 35A to deploy beyond the lip formed by the trim cover 50 and pillar without catching.

Figure 6D:
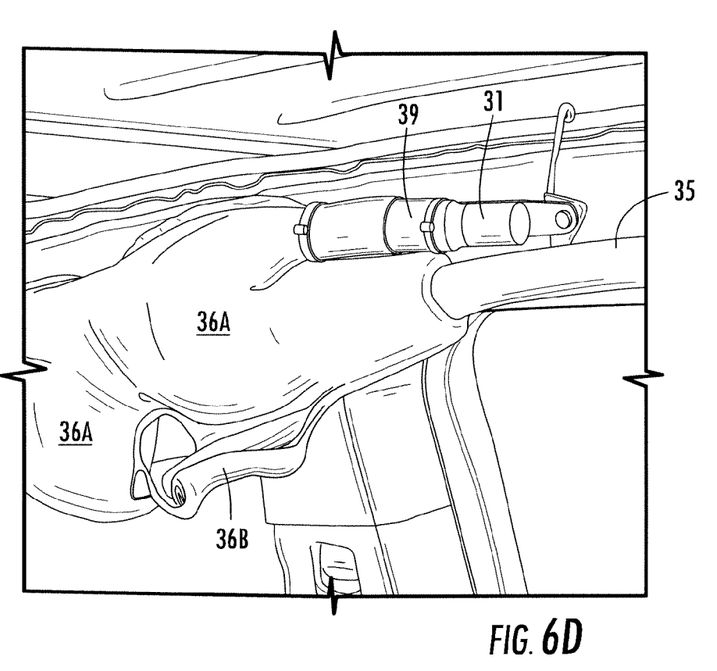
Figure 6E:
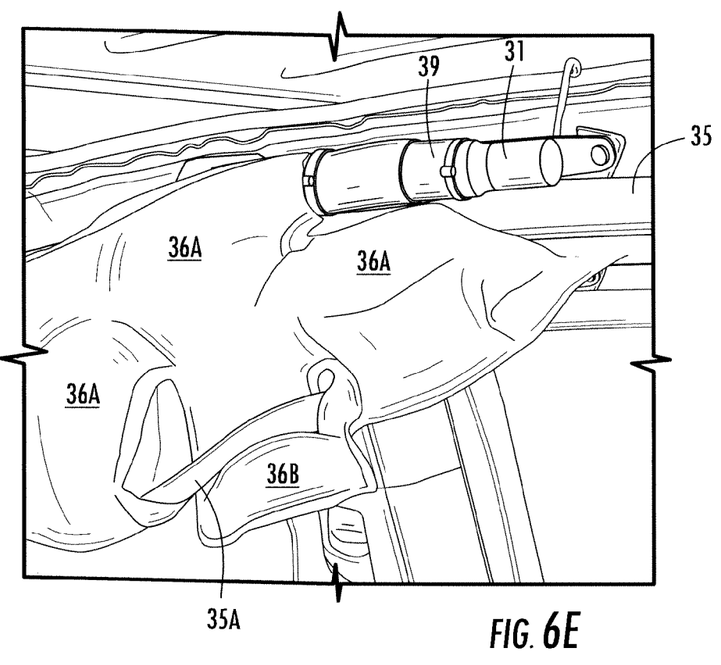

FIG. 6D is a view from inside the vehicle 20 of the airbag cushion 35 later during deployment (e.g., at a time increment of approximately 5.114 ms from the initiation of deployment of the airbag cushion) as the IB roll 35D continues to move inboard between the trim cover 50 and the OB roll 35A. FIG. 6E is a view from inside the vehicle 20 of the airbag cushion 35 later during deployment (e.g., at a time increment of approximately 6.714 ms from the initiation of deployment of the airbag cushion), whereby the outboard roll 35A has deployed beyond the trim cover 50 and begins to unroll, while the second inflatable chamber 36B begins to inflate in order to provide protection to an occupant from direct contact with the trim cover and pillar of the vehicle.

Figure 6F:
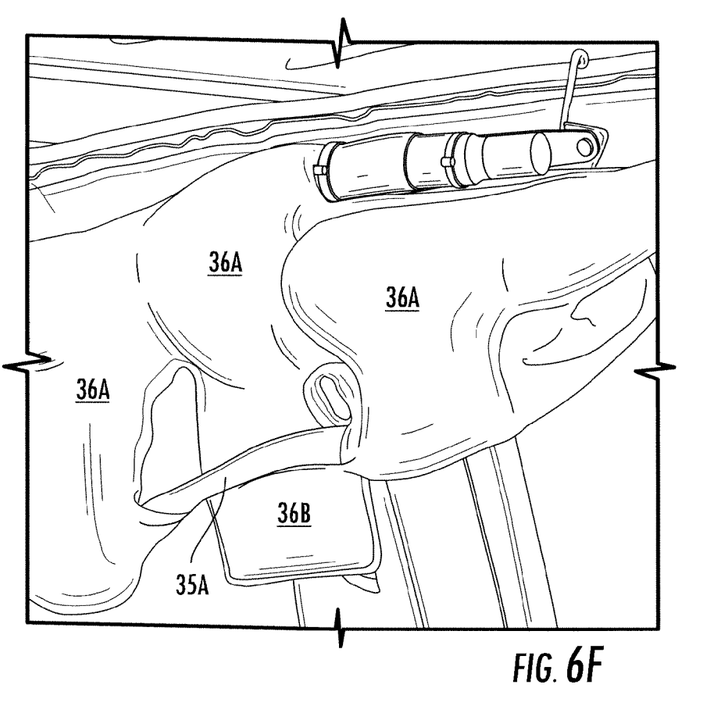
Figure 6G:
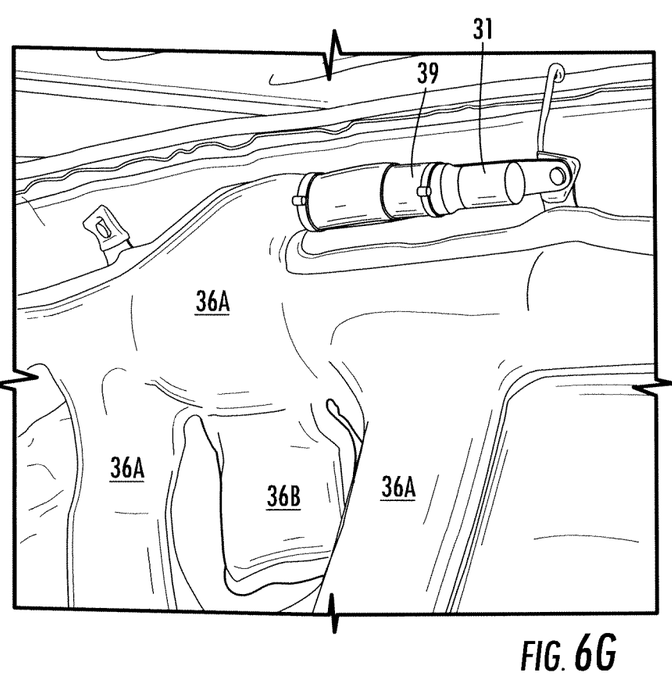

FIG. 6F is a view from inside the vehicle 20 of the airbag cushion 35 later during deployment (e.g., at a time increment of approximately 8.114 ms from the initiation of deployment of the airbag cushion), whereby the first inflatable chamber 36A of the airbag cushion 35 continues to deploy substantially downwardly along the interior of the door assembly, the OB roll 35A unrolling as the first chamber 36A is inflated and the second chamber 36B continuing to inflate. FIG. 6G is a view from inside the vehicle 20 of the airbag cushion 35 when the airbag cushion 35 is fully deployed (e.g., at a time increment of 20.925 ms from the initiation of deployment of the airbag cushion), whereby both the first and second inflatable chambers 36A, 36B are inflated and deployed in position to provide occupant restraint and protection.

The airbag modules including airbag cushions, as disclosed herein, having second inflatable chambers configured to aid the deployment of the first inflatable chamber to avoid catching on the interior vehicle components, such as trim or structure forming the pillars, improve reliability and repeatability of airbag deployment. The second inflatable chamber aids the first inflatable chamber of the airbag cushion, during inflation, to deploy without external (relative to the airbag module) influence to the deployment trajectory as well as to the final positioning of the cushion, such as from the pillars and trim covers covering the pillar. The second inflatable chamber locates between the trim cover (or pillar) and the first deploying chamber providing a substantially smooth surface to deploy along to prevent catching of the inflating first deploying chamber. After aiding the deployment of the first inflatable chamber, the second inflatable chamber then inflates to provide occupant restraint and protection from direct contact with a portion of the vehicle interior, such as the B-pillar, that the second inflatable chamber inflates adjacent to.

The second inflatable chambers, as disclosed herein, aid deployment of the first inflatable chamber without the use of additional components, such as plastic flaps or brackets. The use of other components to aid the first inflatable chamber from avoidance with interior vehicle components during deployment, among other disadvantages, increase cost of the airbag module. Thus, the airbag modules disclosed herein improve reliability of the deployment of the airbag cushion at a reduced cost.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A side curtain air bag module for a motor vehicle, comprising:
   an inflatable cushion comprising a first panel coupled to a second panel; and
   an inflator configured to provide gas for inflating the inflatable cushion;

wherein the first panel and the second panel are joined generally continuously at a peripheral edge of each of the panels to form a first inflatable chamber, and the first panel and the second panel are joined at a central location to form a second inflatable chamber that is in fluidic communication with the first inflatable chamber;

wherein in a stored configuration, the first inflatable chamber is rolled in an outboard direction, and the second inflatable chamber is rolled in an inboard direction and wherein the rolled second inflatable chamber generally wraps around the rolled first inflatable chamber; and wherein in an inflated configuration, the second inflatable chamber is surrounded by inflatable portions of the inflatable cushion.

2. The side curtain air bag module of claim 1, wherein the outer edges of the second inflatable chamber are formed by a generally U-shaped seam coupling the first panel to the second panel, and the inflatable cushion includes a cut along at least a portion of the U-shaped seam to detach the second inflatable chamber from the first inflatable chamber along the cut.

3. The side curtain airbag module of claim 1, wherein the inflatable cushion is configured to mount generally above a structure of a motor vehicle, and the second inflatable chamber is configured to prevent contact between the first inflatable chamber and the structure during an initial stage of deployment.

4. The side curtain airbag module of claim 3, wherein the structure of the motor vehicle is a trim component, and the second inflatable chamber is configured to prevent the trim component from hindering movement of the first inflatable chamber during the initial stage of deployment.

5. The side curtain airbag module of claim 1, wherein the first inflatable chamber is configured to begin inflating prior to when the second inflatable chamber begins inflating.

6. The side curtain airbag module of claim 1, wherein the second inflatable chamber is configured to unroll due to inflation of the first inflatable chamber.

7. The side curtain airbag module of claim 1, wherein the first panel and second panel are joined by a generally H-shaped seam at a central location to form the second inflatable chamber.

8. The side curtain airbag module of claim 7, wherein a generally U-shaped cut along a portion of the H-shaped seam detaches a portion of the second inflatable chamber from the first inflatable chamber.

9. A side curtain airbag module for a motor vehicle, comprising:

an inflatable airbag cushion including: a first inflatable chamber; and a second inflatable chamber in fluidic communication with the first inflatable chamber;

wherein in a stored configuration, the first inflatable chamber is rolled in a first direction, and the second inflatable chamber is wrapped around the first inflatable chamber in an opposite direction to the first direction;

wherein during deployment, the second inflatable chamber is configured to be between the first inflatable chamber and a pillar structure of the motor vehicle; and wherein when fully deployed, the first inflatable chamber and the second inflatable chamber are each positioned adjacent the pillar structure; and wherein, when the airbag cushion is inflated, inflatable portions of the airbag cushion are located both above and below the second inflatable chamber.

10. The side curtain airbag module of claim 9, wherein during deployment, the second inflatable chamber is configured to be between the first inflatable chamber and a trim component covering the pillar structure; and wherein when fully deployed, the first inflatable chamber and the second inflatable chamber are each positioned adjacent the trim component.

11. The side curtain airbag module of claim 9, wherein the first inflatable chamber and the second inflatable chamber are formed by a first panel and a second panel, the first panel being coupled to the second panel at central portions thereof by a U-shaped seam.

12. The side curtain airbag module of claim 11, wherein a cut at least partially along the U-shaped seam separates the second inflatable chamber from the first inflatable chamber.

13. The side curtain airbag module of claim 11, wherein the airbag module is configured to be mounted above the pillar structure of the motor vehicle;

wherein during an initial stage of deployment, the second inflatable chamber is configured to engage the pillar structure to prevent contact between the first inflatable chamber and the pillar structure.

14. The side curtain airbag module of claim 13, wherein the second inflatable chamber is configured to engage the pillar structure to prevent the pillar structure from hindering deployment of the first inflatable chamber.

15. The side curtain airbag module of claim 13, wherein when fully deployed, the first inflatable chamber prevents contact between an occupant and a lower portion of the pillar structure, and the second inflatable chamber prevents contact between the occupant and an upper portion of the pillar structure.

16. The side curtain airbag module of claim 9, wherein during deployment, the second inflatable chamber is configured to be positioned between the first inflatable chamber and the pillar structure prior to inflation of the second inflatable chamber.

17. The side curtain airbag module of claim 16, wherein the second inflatable chamber is positioned against the pillar structure due to inflation of the first inflatable chamber.

18. A side curtain air bag module for a motor vehicle, comprising:

an inflatable cushion comprising a first panel coupled to a second panel; and an inflator configured to provide gas for inflating the inflatable cushion;

wherein the first panel and the second panel are joined generally continuously at a peripheral edge of each of the panels to form a first inflatable chamber, and the first panel and the second panel are joined at a central location to form a second inflatable chamber that is in fluidic communication with the first inflatable chamber;

wherein in a stored configuration, the first inflatable chamber is rolled in an outboard direction, and the second inflatable chamber is rolled in an inboard direction and wherein the rolled second inflatable chamber generally wraps around the rolled first inflatable chamber; and wherein the outer edges of the second inflatable chamber are formed by a generally U-shaped seam coupling the first panel to the second panel, and the inflatable cushion includes a cut along at least a portion of the U-shaped seam to detach the second inflatable chamber from the first inflatable chamber along the cut.

* * * * *